US011573602B2

(12) United States Patent
Lin et al.

(10) Patent No.: US 11,573,602 B2
(45) Date of Patent: Feb. 7, 2023

(54) FOLDABLE ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/369,973

(22) Filed: Jul. 8, 2021

(65) Prior Publication Data

US 2022/0083101 A1    Mar. 17, 2022

Related U.S. Application Data

(60) Provisional application No. 63/078,332, filed on Sep. 15, 2020.

(51) Int. Cl.
*G06F 1/16* (2006.01)

(52) U.S. Cl.
CPC .......... *G06F 1/1641* (2013.01); *G06F 1/1616* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 6,212,069 | B1* | 4/2001 | Janik | G06F 1/1637 |
| | | | | 361/679.55 |
| 8,532,723 | B2* | 9/2013 | Ahn | G06F 1/1643 |
| | | | | 455/566 |
| 9,009,984 | B2* | 4/2015 | Caskey | H04M 1/0247 |
| | | | | 33/355 R |
| 10,254,803 | B1* | 4/2019 | Quinn | G06F 1/1688 |
| 10,852,775 | B1* | 12/2020 | Kim | E05D 3/02 |
| 2006/0139862 | A1* | 6/2006 | Wang | G06F 1/1641 |
| | | | | 361/679.3 |
| 2008/0117572 | A1* | 5/2008 | Maatta | G06F 1/1624 |
| | | | | 361/679.15 |
| 2020/0371563 | A1* | 11/2020 | Collins | H05K 7/16 |

FOREIGN PATENT DOCUMENTS

| | | |
|---|---|---|
| TW | M604534 | 11/2020 |
| TW | I721758 | 3/2021 |

* cited by examiner

*Primary Examiner* — Anthony Q Edwards
*Assistant Examiner* — Rashen E Morrison
(74) *Attorney, Agent, or Firm* — JCIPRNET

(57) ABSTRACT

A foldable electronic device including a first body having a first side and a second side, a second body rotatably connected to the first side of the first body, at least one sliding structure disposed in the first body and adjacent to the second side, a first screen rotatably connected to the second body and movably disposed at the at least one sliding structure, at least one hinge structure disposed in the first body and connected to the at least one sliding structure, and a second screen disposed at the at least one hinge structure and located at the second side is provided. The second body is adapted to rotate relative to the first body and driving the first screen to move along the at least one sliding structure to switch to a closed state or an unfolding state.

14 Claims, 13 Drawing Sheets

FOLDABLE ELECTRONIC DEVICE

CROSS-REFERENCE TO RELATED APPLICATION

This application claims the priority benefit of U.S. provisional application Ser. No. 63/078,332, filed on Sep. 15, 2020. The entirety of the above-mentioned patent application is hereby incorporated by reference herein and made a part of this specification.

BACKGROUND

Technical Field

The disclosure relates to a foldable electronic device, and more particularly, to a foldable electronic device with multiple screens.

Description of Related Art

Existing notebook computers are mainly set up with a single screen. However, with the increase in user demand, a single screen has gradually become insufficient for use. The reason is that the size of the existing screen is too small, and the user opens the software and receives too much information, resulting in insufficient display space. During the operation, the user browses the Internet, edits documents, watches videos, and receives messages at the same time, and the user needs to constantly switch the display screen, which will greatly reduce concentration and work efficiency.

Therefore, nowadays, a notebook computer with an external screen has been developed. The external screen has the following disadvantages. The external screen needs to be disassembled and stored when not in use, and reinstalled when in use, and thus it is not conducive to being carried out. In addition, the external screen is prone to loosen or shift due to external force.

SUMMARY

The disclosure provides a foldable electronic device having a first screen and a second screen. In an unfolding state, the first screen is separated from the second screen to expand a display range, while in a closed state, the first screen leans against the second screen to reduce a volume. Therefore, manual disassembly is not required.

The foldable electronic device of the disclosure includes a first body, a second body, at least one sliding structure, a first screen, at least one hinge structure, and a second screen. The first body has a first side and a second side. The second body is rotatably connected to the first side of the first body. The at least one sliding structure is disposed in the first body and adjacent to the second side. The first screen is rotatably connected to the second body, and is movably disposed at the at least one sliding structure. The at least one hinge structure is disposed in the first body, and is connected to the at least one sliding structure. The second screen is disposed at the at least one hinge structure, and is located at the second side. The second body is adapted to rotate relative to the first body and drive the first screen to move along the at least one sliding structure to switch to the closed state and the unfolding state. In the closed state, the first screen leans against the first body and the second screen. In the unfolding state, a lifting angle is formed between the first screen and the first body, and the first screen is separated from the second screen. The second screen is adapted to be bent relative to the first body.

Based on the above, the foldable electronic device of the disclosure has the first screen and the second screen. In the unfolding state, the first screen moves along the at least one sliding structure, and is separated from the second screen, so as to expand the display range. At this time, the second screen is adapted to be bent relative to the first body for adjustment. In the closed state, the first screen leans against the first body and the second screen to reduce the volume and facilitate storage.

Furthermore, during the unfolding process, when the first screen has not moved yet in place, the first screen and the second screen still partially overlap, thereby restricting the second screen from being able to be bent relative to the first body and avoiding the second screen from colliding with the first screen due to the external force. In addition, when the second screen is switched to the unfolding state, and the second screen has been bent relative to the first body, the user may apply force to the second body to drive the first screen to move along the first body and simultaneously push against the second screen to rotate relative to the first body to an initial position. Therefore, a step of manually returning the second screen to an original position may be eliminated.

DETAILED DESCRIPTION OF DISCLOSED EMBODIMENTS

Figure 1A:
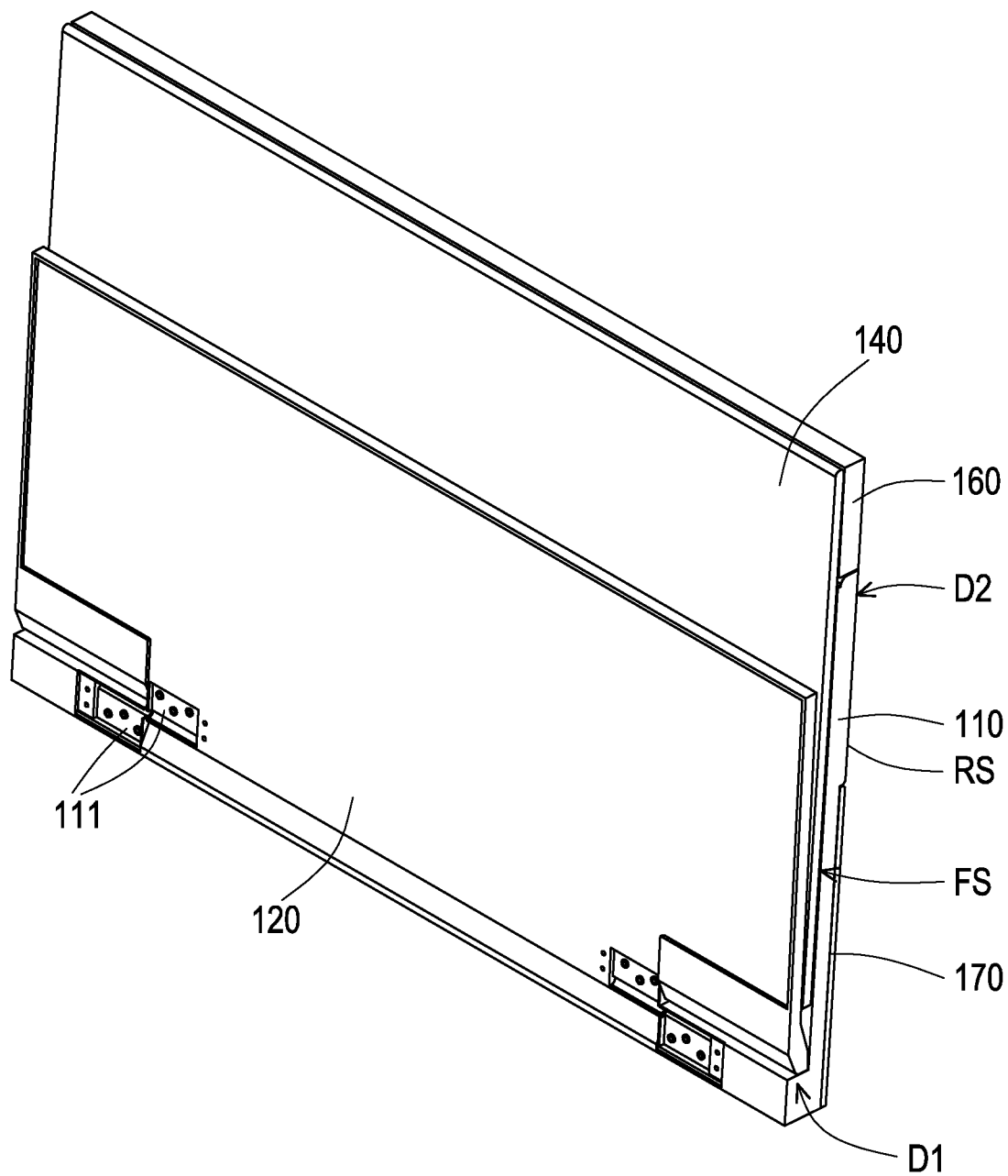
FIG. 1A is a schematic perspective view of a foldable electronic device switched to a closed state according to an embodiment of the disclosure.
Figure 1B:
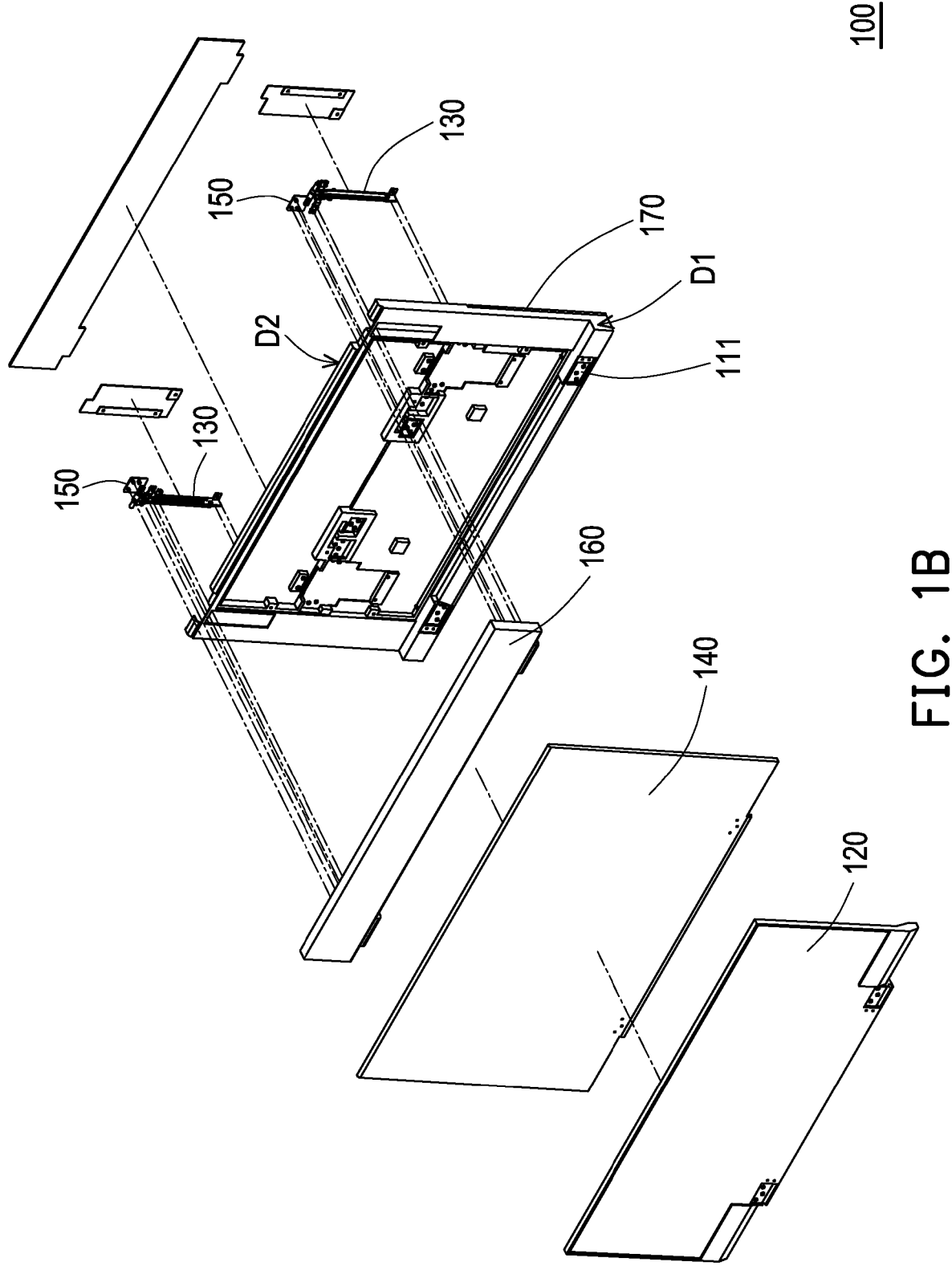
FIG. 1B is a schematic perspective exploded view of the foldable electronic device of FIG. 1A.
Figure 1C:
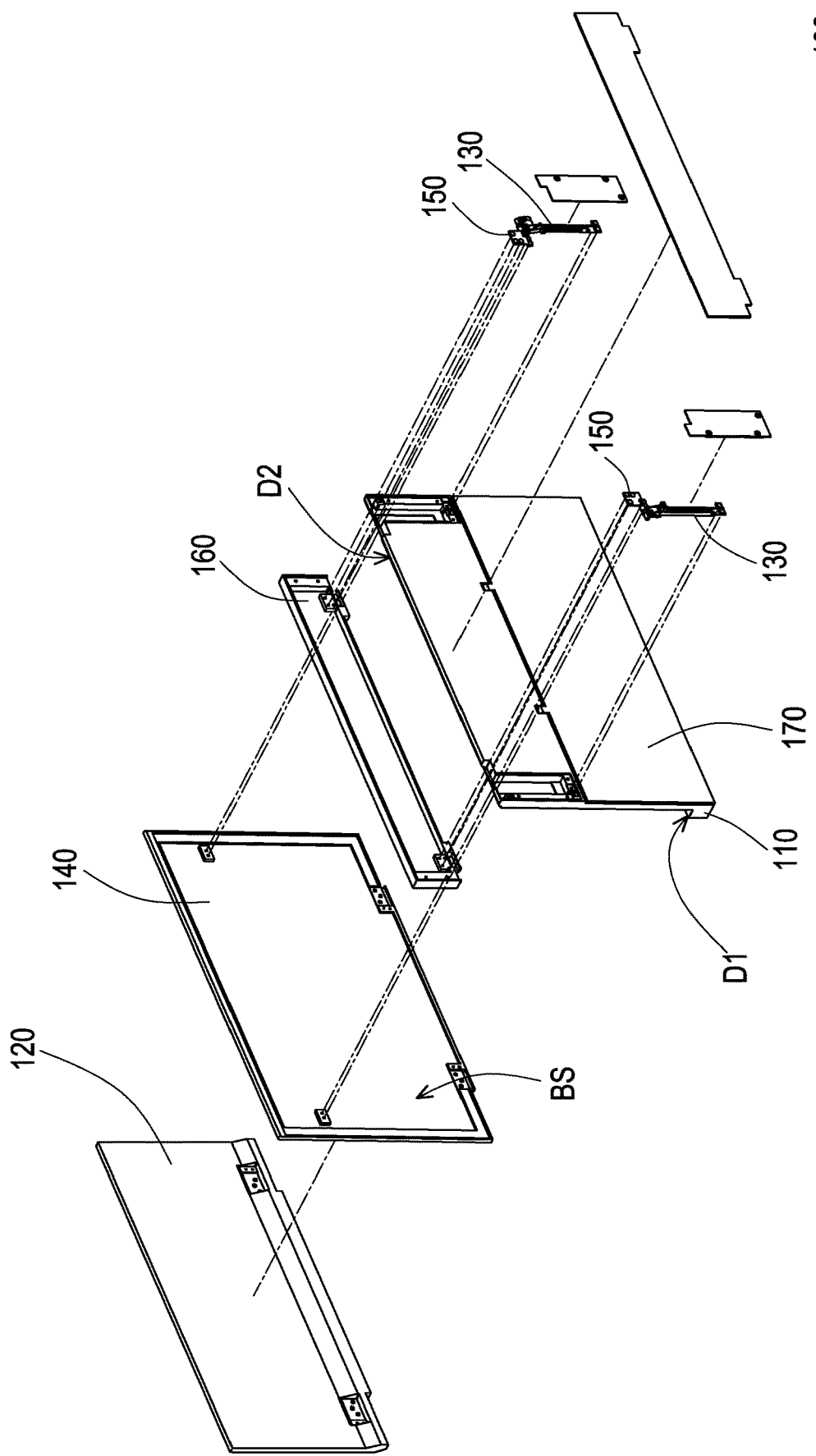
FIG. 1C is a schematic exploded view of components of the foldable electronic device of FIG. 1A from another angle.
Figure 1D:
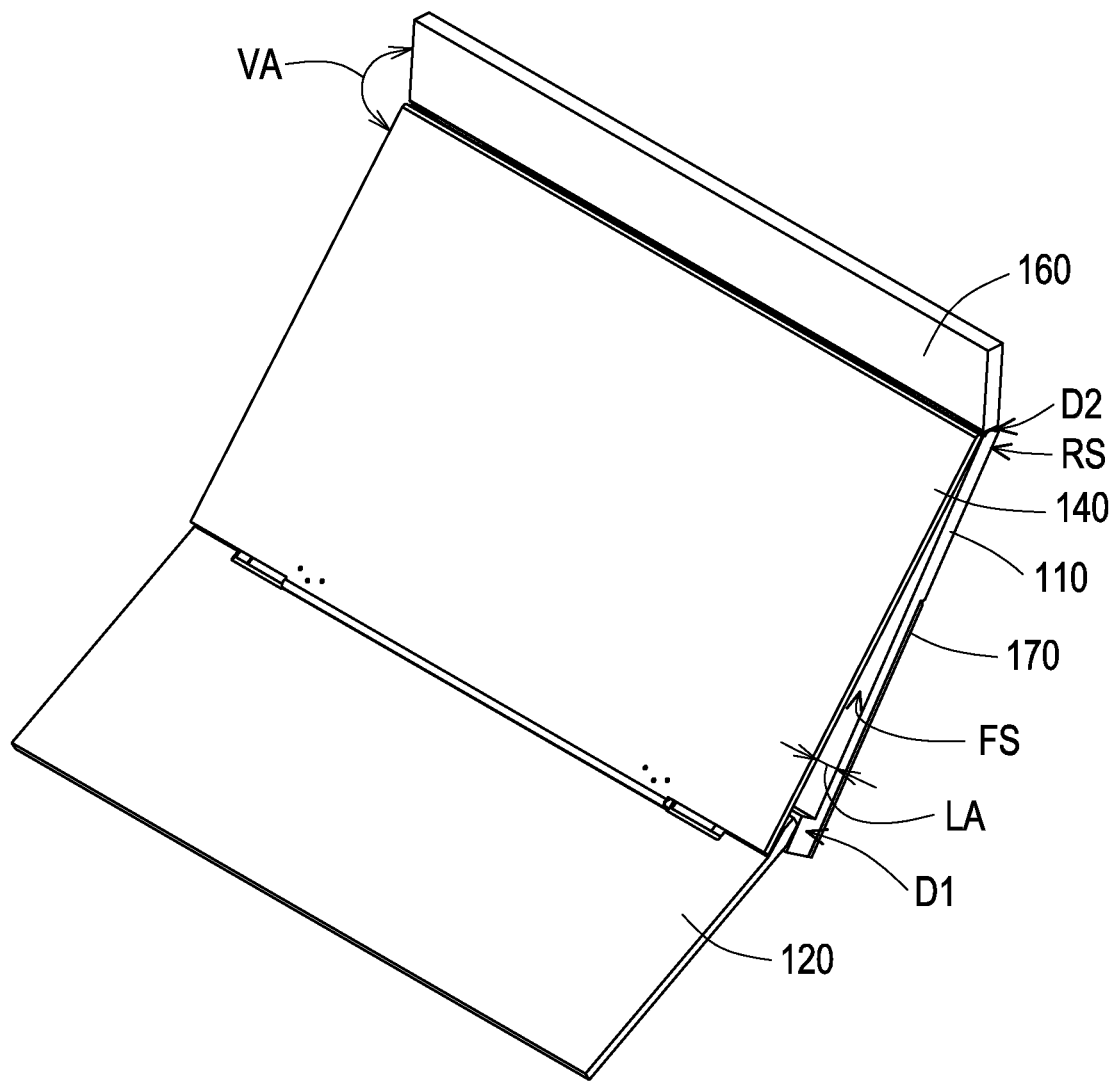
FIG. 1D is a schematic perspective view of the foldable electronic device of FIG. 1A switched to an unfolding state.

FIG. 1A is a schematic perspective view of a foldable electronic device switched to a closed state according to an embodiment of the disclosure. FIG. 1B is a schematic perspective exploded view of the foldable electronic device of FIG. 1A. FIG. 1C is a schematic exploded view of components of the foldable electronic device of FIG. 1A from another angle. FIG. 1D is a schematic perspective view of the foldable electronic device of FIG. 1A switched to an unfolding state.

Figure 2A:
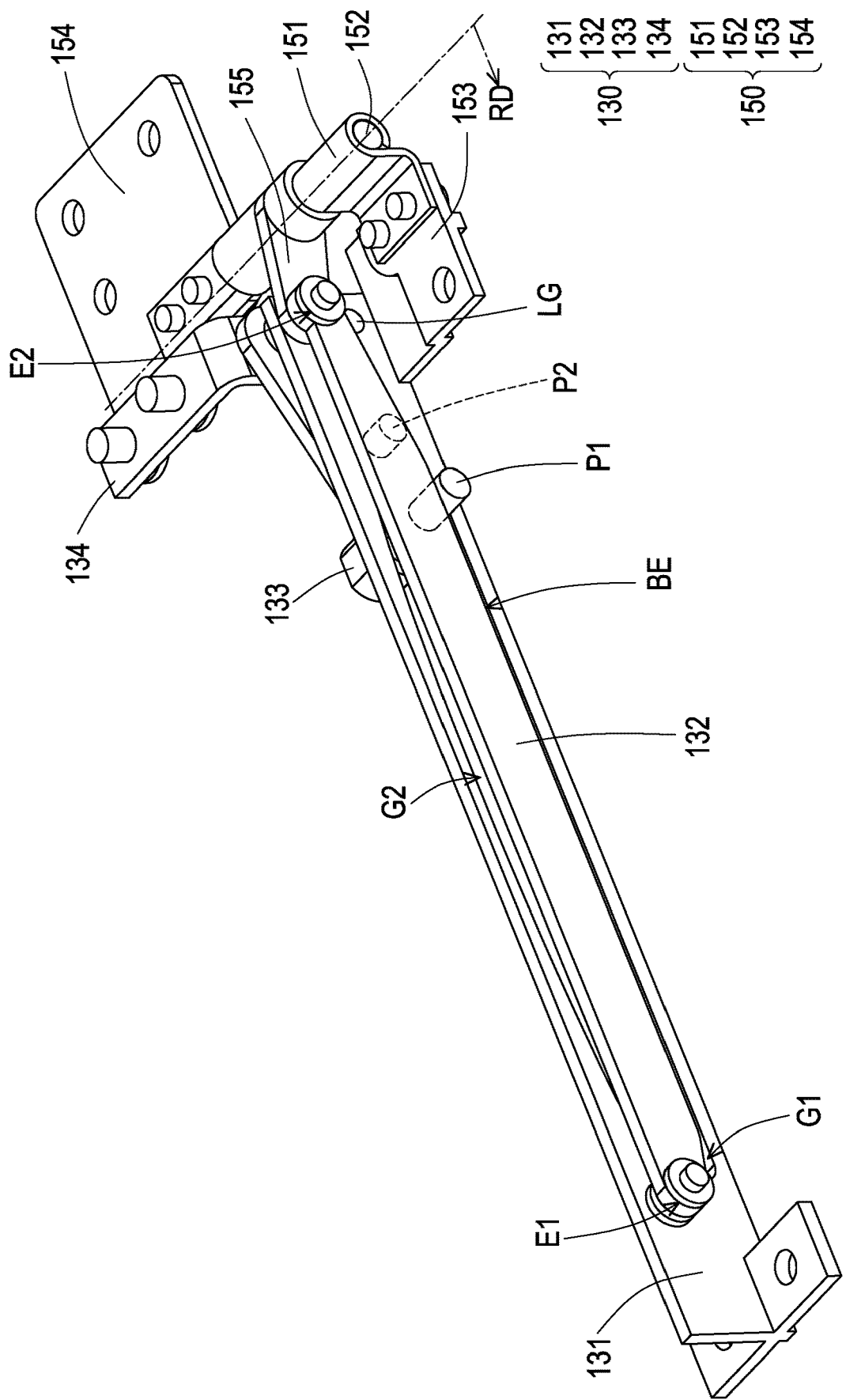
FIG. 2A is a schematic perspective view of a hinge structure and a sliding structure of FIG. 1B.
Figure 2B:
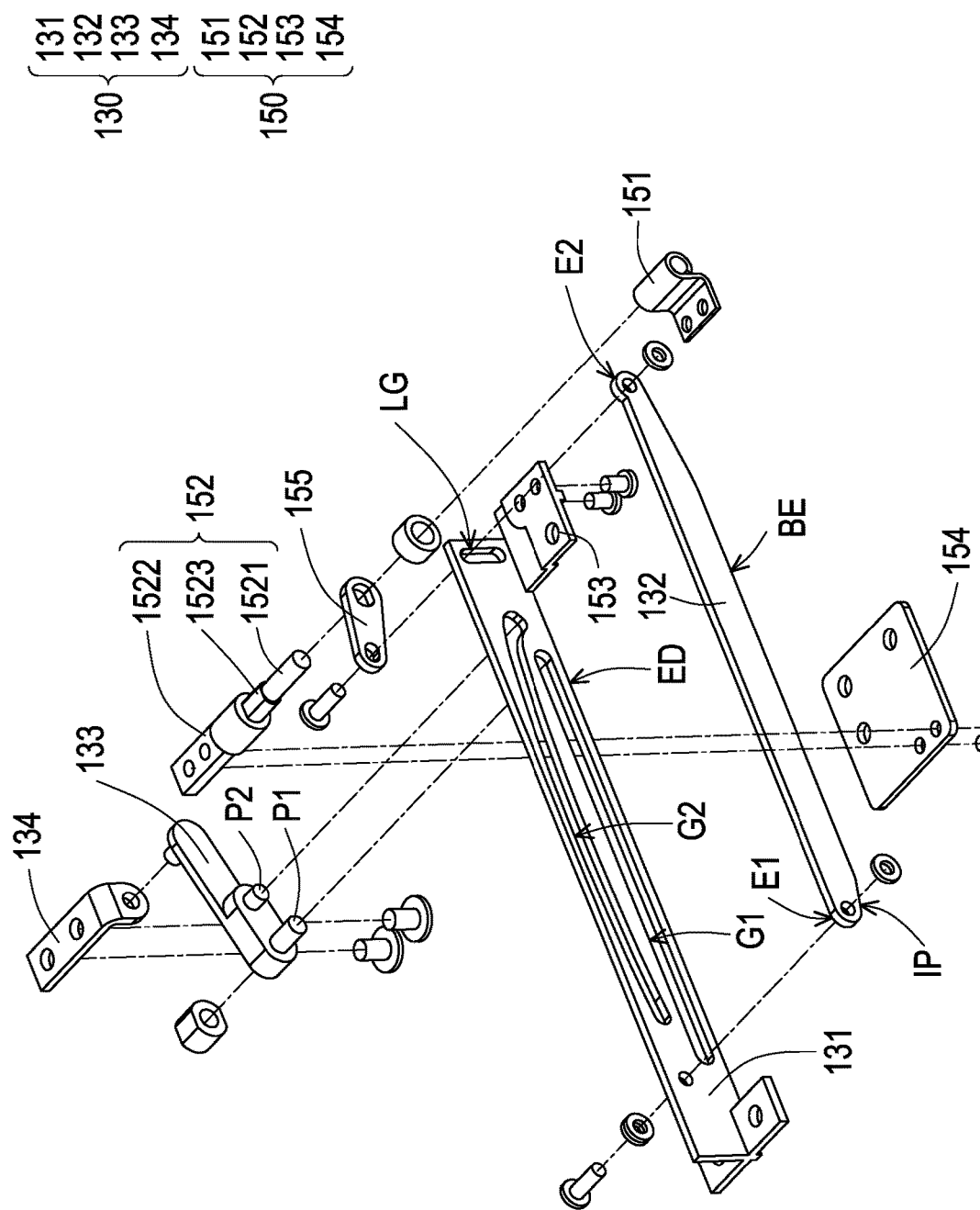
FIG. 2B is a schematic exploded view of components of the hinge structure and the sliding structure of FIG. 2A.

FIG. 2A is a schematic perspective view of a hinge structure and a sliding structure of FIG. 1B. FIG. 2B is a schematic exploded view of components of the hinge structure and the sliding structure of FIG. 2A.

Referring to FIGS. 1A to 1C, the foldable electronic device of the disclosure is, for example, a tablet computer, a smart phone, a notebook computer, or other electronic products that may be unfolded and folded. When a foldable electronic device 100 is pushed by an external force to be unfolded or closed relative to each other, the foldable electronic device 100 is switched to the closed state for storage, or switched to the unfolding state for use.

Referring to FIGS. 1A to 1C, 2A, and 2B, the foldable electronic device 100 of the disclosure includes a first body 110, a second body 120, at least one sliding structure 130, a first screen 140, at least one hinge structure 150, and a second screen 160.

The first body 110 has a first side D1, a second side D2, and a front side FS. The second body 120 is rotatably connected to the first side D1 of the first body 110. In this embodiment, a hinge module 111 is disposed at the first side D1 of the first body 110, and the second body 120 is connected to the hinge module 111, and is adapted to rotate relative to the first body 110 to be unfolded or closes relative to each other. In addition, the first body 110 is, for example, a screen housing configured to store the first screen 140. The second body 120 is, for example, a host, which is configured to install an electronic component such as a central processing unit, a display card, a memory, a hard disk, and a keyboard.

Referring to FIGS. 1A to 1C, the at least one sliding structure 130 is disposed in the first body 110 and adjacent to the second side D2. In this embodiment, the number of the at least one sliding structure 130 includes two, and two sliding structures 130 are disposed in the first body 110 at intervals. The first screen 140 is rotatably connected to the second body 120, and is movably disposed at the two sliding structures 130. The number of the at least one hinge structure 150 includes two, and two hinge structures 150 are disposed in the first body 110 at intervals. The two hinge structures 150 are respectively connected to the two sliding structures 130. The second screen 160 is disposed at the two hinge structures 150, and is located at the second side D2 of the first body 110.

Figure 3A:
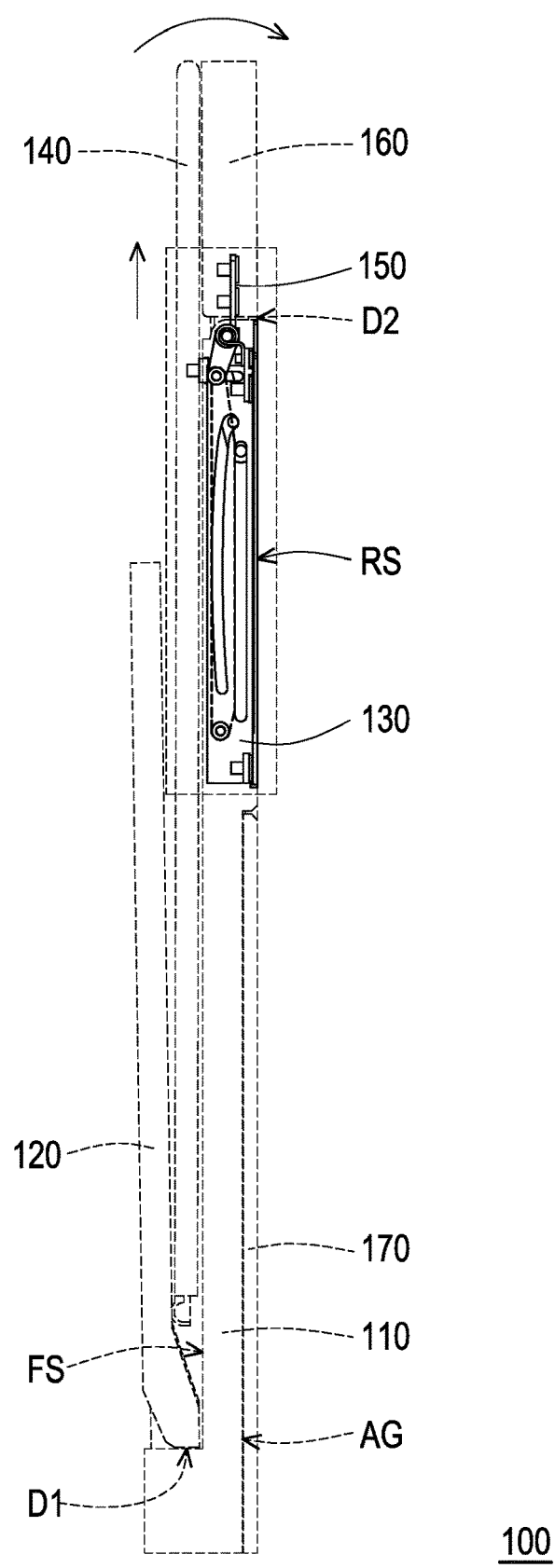
FIGS. 3A to 3C are flowcharts of the foldable electronic device of FIG. 1A switched from the closed state to the unfolding state.
Figure 3B:
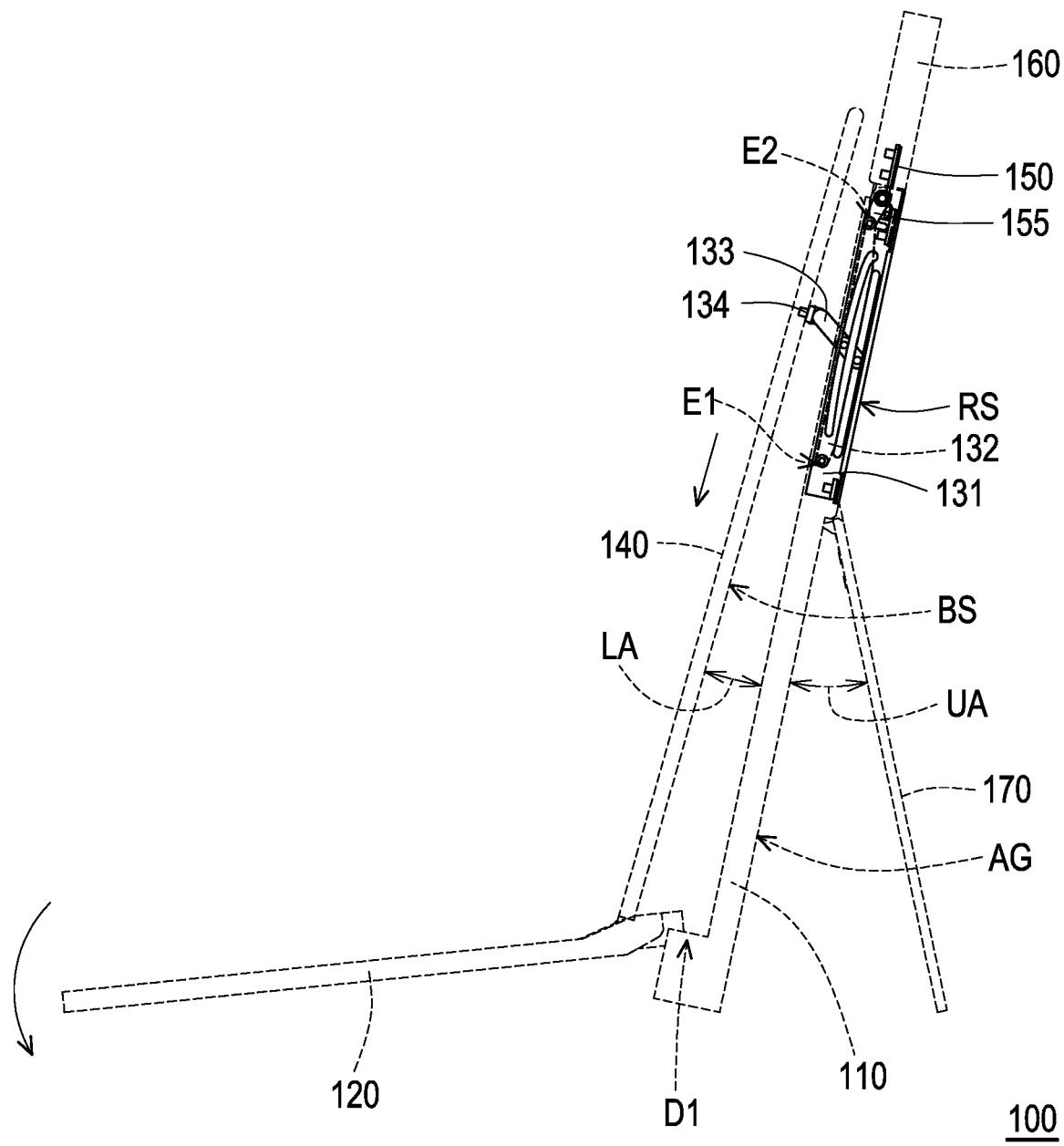
Figure 3C:
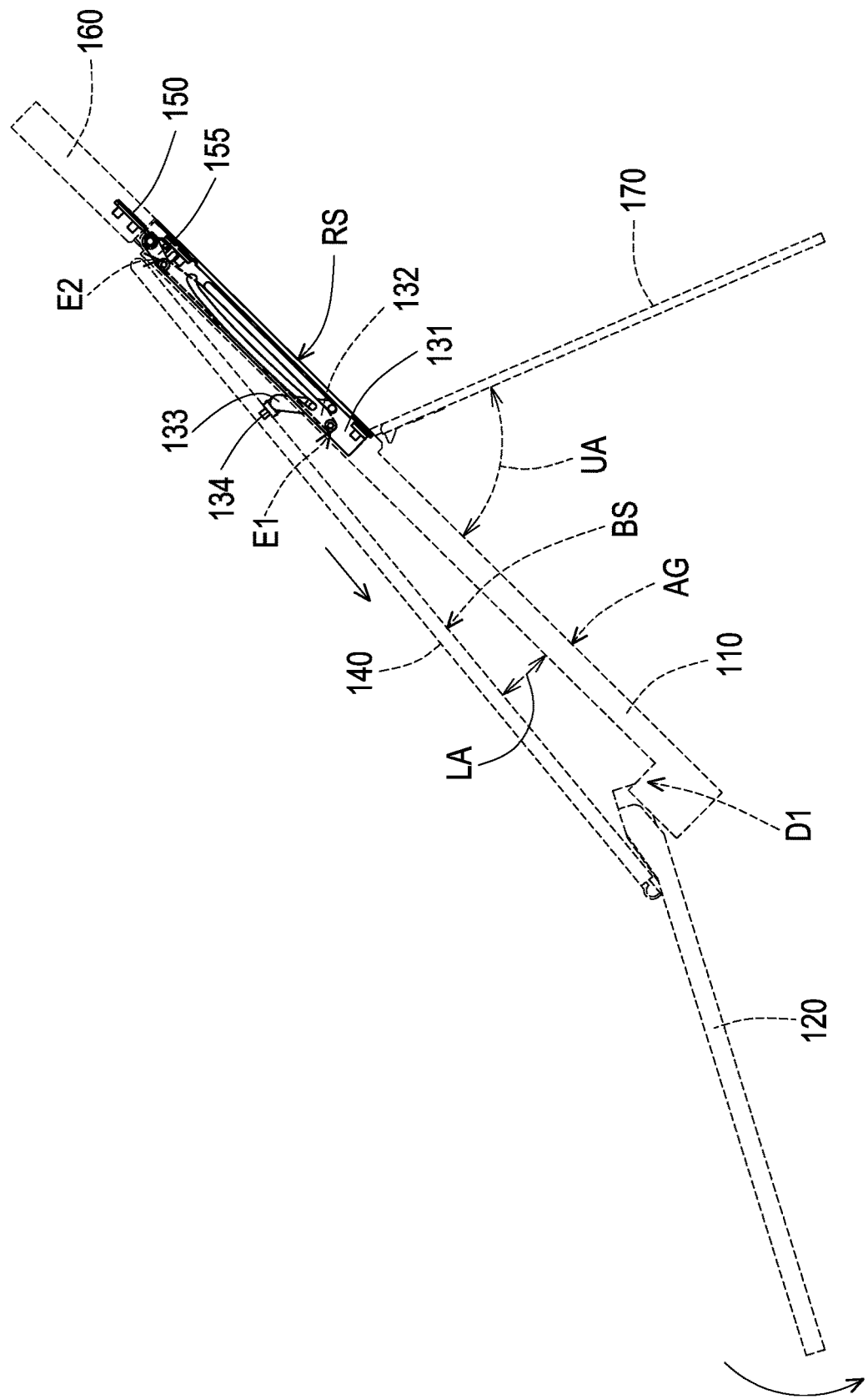
Figure 4A:
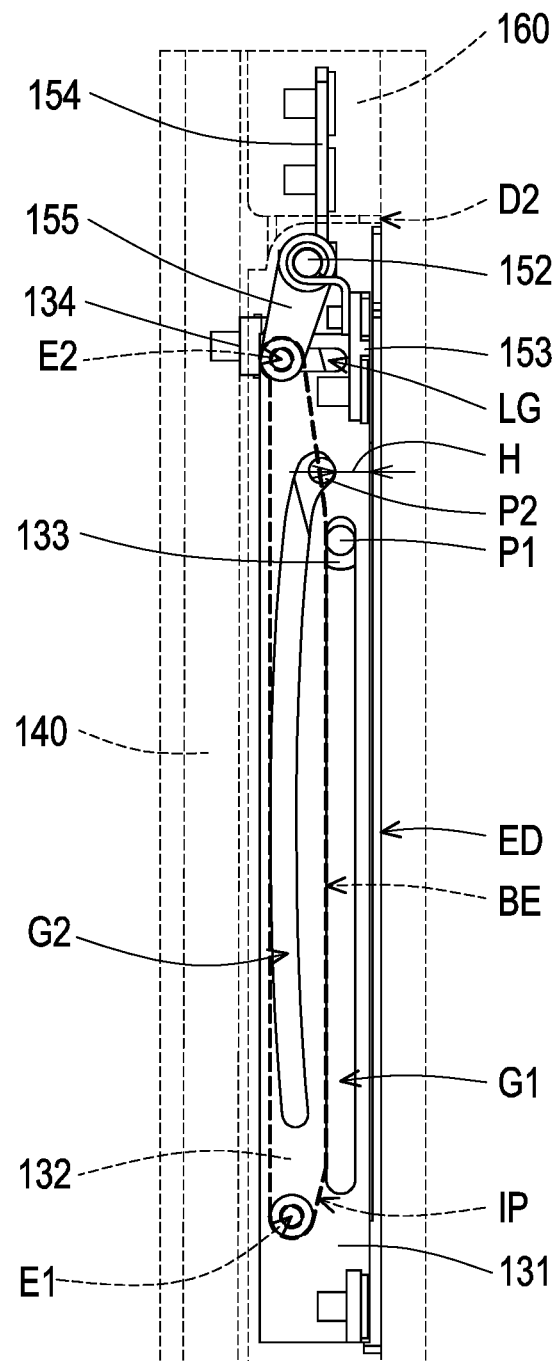
FIGS. 4A to 4C are respectively schematic partial enlarged views of the foldable electronic device of FIG. 3A, FIG. 3B, and FIG. 3D.
Figure 4B:
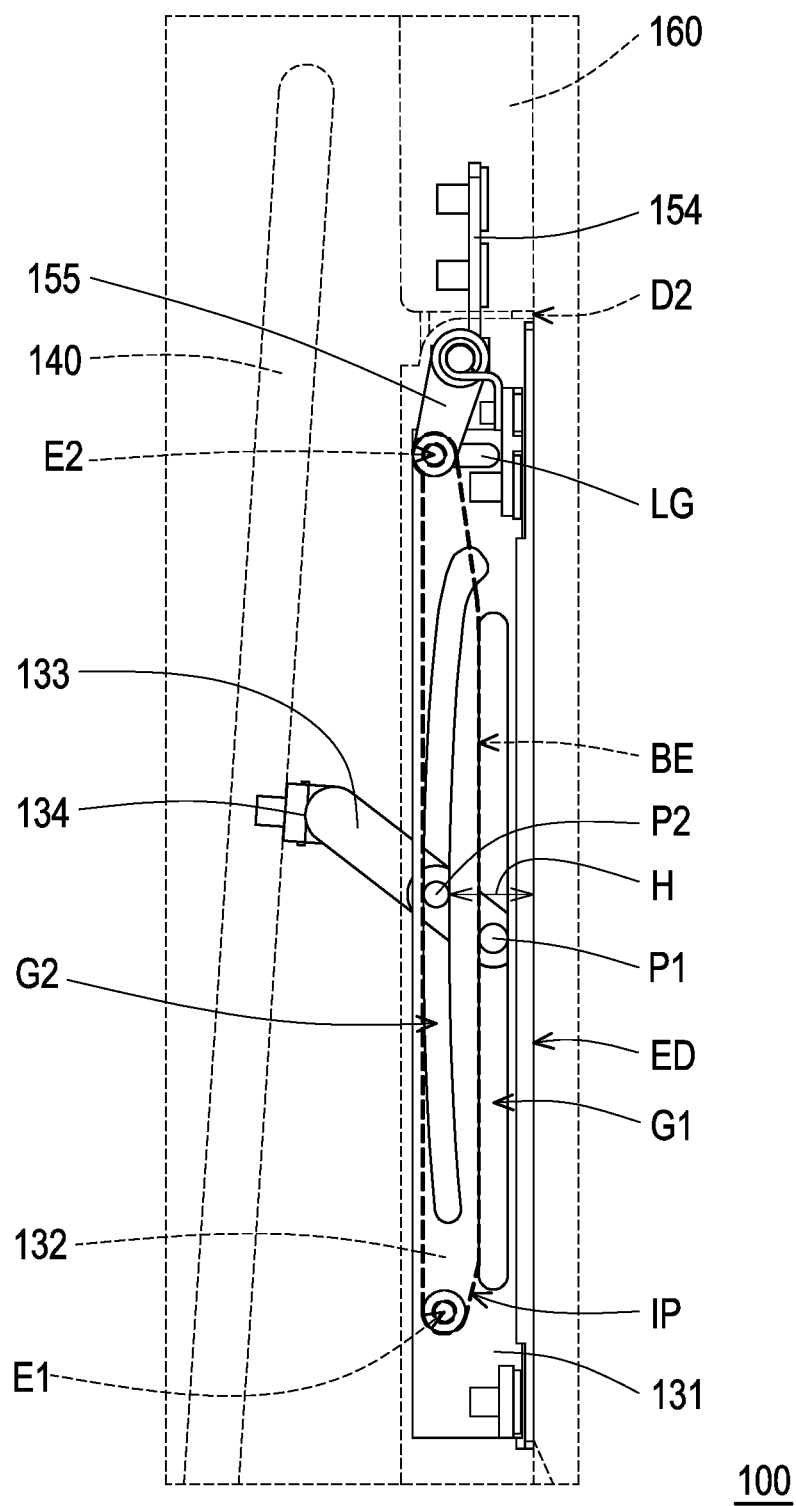
Figure 4C:
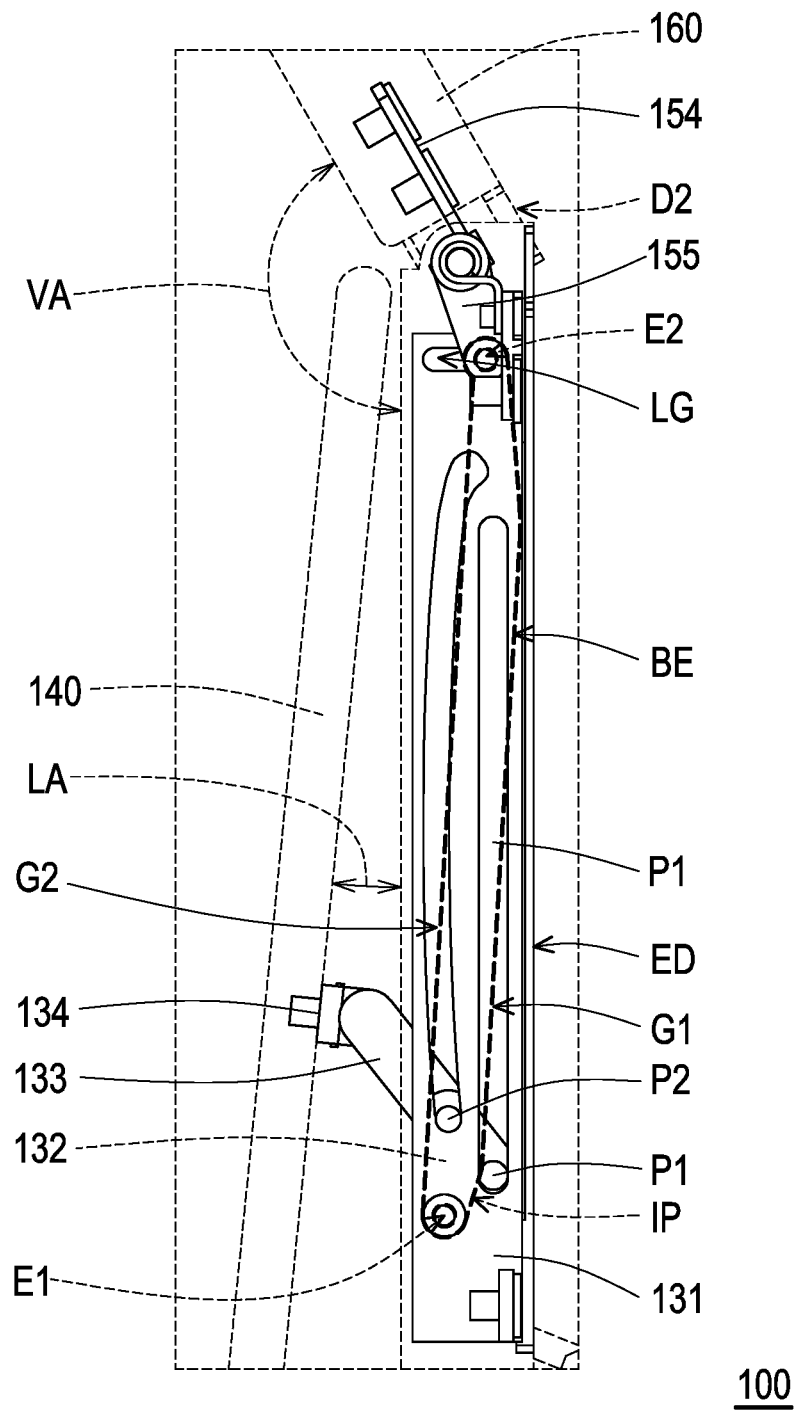

FIGS. 3A to 3C are flowcharts of the foldable electronic device of FIG. 1A switched from the closed state to the unfolding state. FIGS. 4A to 4C are respectively schematic partial enlarged views of the foldable electronic device of FIGS. 3A to 3C.

Referring to FIGS. 3A to 3C, the second body 120 is adapted to rotate relative to the first body 110 through the hinge module 111, and drive the first screen 140 to move along the two sliding structures 130 and the front side FS of the first body 110, so as to switch to the closed state and the unfolding state.

Figure 3D:
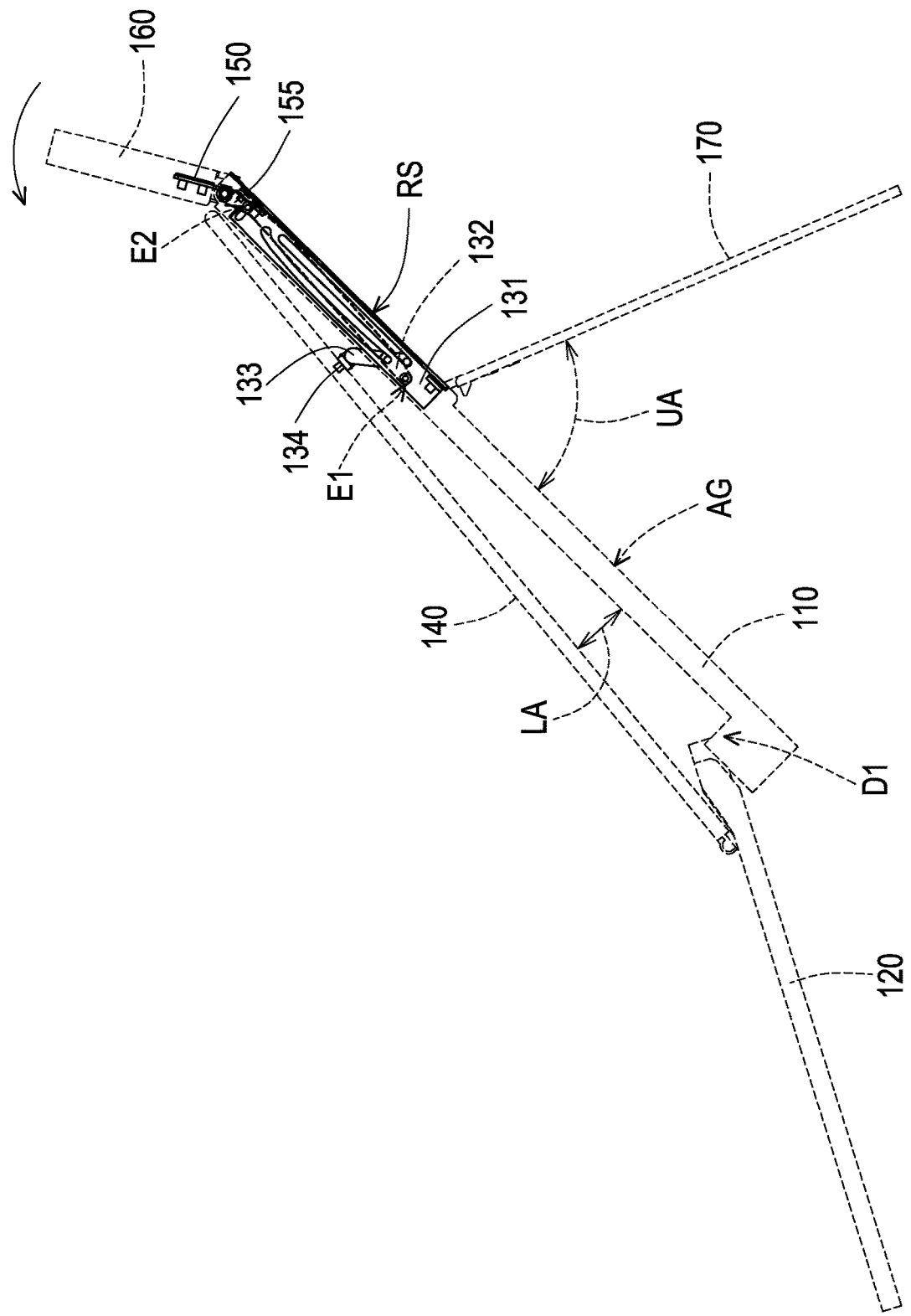
FIG. 3D is a schematic view of the second screen bent relative to the first body of the foldable electronic device of FIG. 1A.

Referring to FIG. 3A, in the closed state of the foldable electronic device 100, the first screen 140 leans against the front side FS of the first body 110 and the second screen 160, and the second body 120 is close to the first screen 140. At this time, the first screen 140 and the second screen 160 may be automatically switched to a sleep state. Referring to FIG. 3C, in the unfolding state of the foldable electronic device 100, the first screen 140 is lifted above the front side FS, and a lifting angle LA is formed between the first screen 140 and the first body 110. In addition, the first screen 140 slides along the front side FS to be separated from the second screen 160. Referring to FIG. 3D, after the first screen 140 is separated from the second screen 160, the restriction on the second screen 160 has been lifted. Therefore, the second screen 160 is adapted to be bent relative to the first body 110.

Furthermore, this is configured to adjust a viewing angle VA of the second screen 160, and is adapted to switch the first screen 140 and the second screen 160 to a synchronous display mode or an individual display mode. In the synchronous display mode, a display range of the first screen 140 may be expanded, while in the individual display mode, the second screen 160 is configured to display text information such as a message, a letter notification, and a date and time.

Referring to FIGS. 1A, 1B, 2A, and 2B, each of the above sliding structures 130 includes a base 131, a position-limiting frame 132, a sliding linkage 133, and a main bearing plate 134.

Referring to FIGS. 3B and 3C together, the base 131 is fixed in the first body 110. The position-limiting frame 132 has a first end E1 and a second end E2. The first end E1 is pivotally connected to the base 131 and away from the corresponding hinge structure 150. The second end E2 is movably disposed on the base 131 and connected to the corresponding hinge structure 150. The sliding linkage 133 is slidably disposed on the base 131. The main bearing plate 134 is pivotally connected to the sliding linkage 133 and connected to a bottom surface BS of the first screen 140.

Furthermore, the base 131 has a first sliding groove G1 and a second sliding groove G2. The first sliding groove G1 is formed through the base 131, and is adjacent to a bottom edge ED of the base 131. The first sliding groove G1 has a linear appearance. The second sliding groove G2 is formed through the base 131, and is located above the first sliding groove G1. The second sliding groove G2 has a curved appearance.

Referring to FIGS. 2B and 4A to 4C, the sliding linkage 133 has a first pin P1 and a second pin P2. The first pin P1 and the second pin P2 slidably pass through the first sliding groove G1 and the second sliding groove G2, respectively. The first pin P1 moves along the first sliding groove G1 and contacts a lower edge BE of the position-limiting frame 132, and the second pin P2 is adapted to move along the second sliding groove G2 to move up and down in the base 131.

In addition, the first pin P1 of the sliding linkage 133 slides along the first sliding groove G1 to abut against and support the lower edge BE of the position-limiting frame 132. The second pin P2 of the sliding linkage 133 slides along the second sliding groove G2 to drive the main bearing plate 134 and the first screen 140 to be lifted above the front side FS of the first body 110.

Referring to FIGS. 3A and 4A together, in the closed state of the foldable electronic device 100, the first pin P1 moves to an end of the first sliding groove G1 close to the second screen 160 and abuts against the lower edge BE of the position-limiting frame 132, so that the first end E1 of the position-limiting frame 132 may not pivot relative to the base 131. The second pin P2 moves to an end of the second sliding groove G2 close to the second screen 160, and a height H between the second pin P2 and the bottom edge ED gradually decreases along the second sliding groove G2. Therefore, the sliding linkage 133 drives the main bearing plate 134 to enter the first body 110, so that the first screen 140 leans against the front side FS of the first body 110 and the second screen 160.

Referring to FIGS. 3C and 4C together, in the unfolding state of the foldable electronic device 100, the first pin P1 moves to an end of the first sliding groove G1 away from the second screen 160 and aligns with an inclined surface IP of the position-limiting frame 132, so that the restriction on the lower edge BE of the position-limiting frame 132 is lifted.

Therefore, the first end E1 of the position-limiting frame 132 is adapted to pivot relative to the base 131. The second pin P2 moves to an end of the second sliding groove G2 away from the second screen 160, and the height H between the second pin P2 and the bottom edge ED gradually increases along the second sliding groove G2. Therefore, the sliding linkage 133 drives the main bearing plate 134 to protrude from the first body 110, so that the first screen 140 is lifted from the front side FS of the first body 110 and the second screen 160.

Referring to FIGS. 3B and 4B together, when the first pin P1 moves to a middle of the two ends of the first sliding groove G1, the first pin P1 abuts against the lower edge BE of the position-limiting frame 132, so that the first end E1 of the position-limiting frame 132 may not pivot relative to the base 131, and the second pin P2 moves to a middle of the two ends of the second sliding groove G2. At this time, the sliding linkage 133 drives the main bearing plate 134 to protrude from the first body 110, so that the first screen 140 is lifted from the front side FS of the first body 110 and partially overlaps the second screen 160.

Referring to FIGS. 3D, 3B, and 3A, when the first body 110 and the second body 120 are switched from the unfolding state (see FIG. 3D) to the closed state (see FIG. 3A), the second body 120 is adapted to drive the first screen 140 to slide along the front side FS of the first body 110 toward the second side D2, and the first screen 140 pushes against the second screen 160 to rotate, so as to be flush with the second side D2 of the first body 110.

Referring to FIGS. 2A and 2B, each of the above hinge structures 150 includes a torque element 151, a rotating shaft 152, a first bracket 153, a second bracket 154, and a driving rod 155.

The torque element 151 is disposed in the first body 110, and is configured to provide torque. The rotating shaft 152 rotatably passes through the torque element 151. When the rotating shaft 152 rotates relative to the torque element 151, the torque is generated through frictional contact to fix a rotating angle of the rotating shaft 152. The first bracket 153 is disposed at the torque element 151, and is fixed to the first body 110. The second bracket 154 is disposed at the rotating shaft 152, and is fixedly connected to the second screen 160. The driving rod 155 is fixedly sleeved over the rotating shaft 152, and is pivotally connected to the second end E2 of the position-limiting frame 132.

Referring to FIGS. 2A and 2B, the rotating shaft 152 has a rotating portion 1521, a connecting portion 1522, and a latching portion 1523. The rotating portion 1521 rotatably passes through the torque element 151. The connecting portion 1522 is away from the rotating portion 1521, and is fixedly connected to the second bracket 154. The latching portion 1523 is located between the rotating portion 1521 and the connecting portion 1522. The driving rod 155 is engaged with the latching portion 1523, and protrudes outward along a radial direction RD of the rotating shaft 152. The driving rod 155 is adapted to rotate relative to the torque element 151 with the rotating shaft 152 to drive the second end E2 of the position-limiting frame 132.

Referring to FIGS. 2B, 3A, and 3D together, the base 131 has a lifting groove LG. The second end E2 of the position-limiting frame 132 and the driving rod 155 are disposed in the lifting groove LG through a fixing pin. When the rotating shaft 152 rotates relative to the torque element 151, the second end E2 of the position-limiting frame 132 is driven to move vertically along the lifting groove LG through the driving rod 155. Referring to FIG. 4C, when the driving rod 155 drives the second end E2 to move to a bottom end of the lifting groove LG, the second screen 160 is bent relative to the first body 110. Referring to FIG. 4A, when the driving rod 155 drives the second E2 to move to a top end of the lifting groove LG, the second screen 160 is flush with the second side D2 of the first body 110.

Referring to FIGS. 3C and 4C together, when the first pin P1 of the sliding linkage 133 moves to the end of the first sliding groove G1 away from the second screen 160 and aligns with the inclined surface IP of the position-limiting frame 132, the first pin P1 does not abut against the lower edge BE of the position-limiting frame 132, and is in an unlocked state. Therefore, the first end E1 of the position-limiting frame 132 may pivot relative to the base 131. In this case, each of the hinge structures 150 is adapted to drive the second end E2 of the position-limiting frame 132 to slide up and down along the lifting groove LG through the driving rod 155. In this way, a viewing angle VA between the second screen 160 and the first body 110 is adjusted.

Referring to FIGS. 3A to 3D, a bracket 170 is further included, which is rotatably connected to a rear side RS of the first body 110 relative to the first screen 140, and is adapted to rotate relative to the first body 110 to switch to a supporting state (see FIG. 3C) or a storage state (see FIGS. 1A and 3A). Furthermore, the first body 110 has an accommodating groove AG formed at the rear side RS of the first body 110.

Referring to FIGS. 3C and 3D, in the supporting state, the bracket 170 is unfolded from the first body 110. The bracket 170 protrudes from the accommodating groove AG, and an unfolding angle UA is formed between the bracket 170 and the rear side RS. Referring to FIGS. 1A and 3A, in the storage state, the bracket 170 enters the accommodating groove AG and is attached to the rear side RS of the first body 110, and the bracket 170 is tightly integrated with the first body 110.

In other embodiments, the unfolding angle UA between the bracket 170 and the rear side RS is, for example, greater than 0 degrees and less than 180 degrees, which depends on the structural design and usage requirements, and the disclosure is not limited thereto.

Based on the above, the foldable electronic device of the disclosure has the first screen and the second screen. In the unfolding state, the first screen moves along the at least one sliding structure, and is separated from the second screen, so as to expand the display range. At this time, the second screen is adapted to be bent relative to the first body for adjustment. In the closed state, the first screen leans against the first body and the second screen to reduce the volume and facilitate storage.

Furthermore, during the unfolding process, when the first screen has not moved yet in place, the first screen and the second screen still partially overlap, thereby restricting the second screen from being able to be bent relative to the first body and avoiding the second screen from colliding with the first screen due to the external force In addition, when the second screen is switched to the unfolding state, and the second screen has been bent relative to the first body, the user may apply force to the second body to drive the first screen to move along the first body and simultaneously push against the second screen to rotate relative to the first body to an initial position. Therefore, a step of manually returning the second screen to an original position may be eliminated.

What is claimed is:

1. A foldable electronic device, comprising:
   a first body having a first side and a second side;
   a second body rotatably connected to the first side of the first body;

at least one sliding structure disposed in the first body and adjacent to the second side;
a first screen rotatably connected to the second body and movably disposed at the at least one sliding structure;
at least one hinge structure disposed in the first body and connected to the at least one sliding structure; and
a second screen disposed at the at least one hinge structure and located at the second side,
wherein the second body is adapted to rotate relative to the first body and drive the first screen to move along the at least one sliding structure to switch to a closed state and an unfolding state, in the closed state, the first screen leans against the first body and the second screen, in the unfolding state, a lifting angle is formed between the first screen and the first body, the first screen is separated from the second screen, and the second screen is adapted to be bent relative to the first body.

2. The foldable electronic device according to claim 1, wherein the at least one sliding structure comprises:
a base fixed in the first body;
a position-limiting frame having a first end and a second end, wherein the first end is pivotally connected to the base, and the second end is movably disposed on the base and connected to the at least one hinge structure;
a sliding linkage slidably disposed on the base; and
a main bearing plate pivotally connected to the sliding linkage and connected to a bottom surface of the first screen.

3. The foldable electronic device according to claim 2, wherein the base has a first sliding groove and a second sliding groove, the sliding linkage has a first pin and a second pin respectively slidably pass through the first sliding groove and the second groove, the first pin moves along the first sliding groove and contacts a lower edge of the position-limiting frame, and the second pin is adapted to move along the second sliding groove to move up and down.

4. The foldable electronic device according to claim 3, wherein in the closed state, the first pin moves to an end of the first sliding groove close to the second screen and abuts against the lower edge of the position-limiting frame, so that the first end of the position-limiting frame is unable to pivot relative to the base, the second pin moves to an end of the second sliding groove close to the second screen, and the sliding linkage drives the main bearing plate to enter the first body, so that the first screen leans against the first body and the second screen.

5. The foldable electronic device according to claim 3, wherein in the unfolding state, the first pin moves to an end of the first sliding groove away from the second screen and aligns with an inclined surface of the position-limiting frame, the first end of the position-limiting frame is adapted to pivot relative to the base, the second pin moves to an end of the second sliding groove away from the second screen, and the sliding linkage drives the main bearing plate to protrude from the first body, so that the first screen is lifted from the first body and the second screen.

6. The foldable electronic device according to claim 3, wherein when the first pin moves to a middle of two ends of the first sliding groove, the first pin abuts against the lower edge of the position-limiting frame, so that the first end of the position-limiting frame is unable to pivot relative to the base, the second pin moves to a middle of two ends of the second sliding groove, and the sliding linkage drives the main bearing plate to protrude from the first body, so that the first screen partially overlaps the second screen.

7. The foldable electronic device according to claim 1, wherein when the first body and the second body are switched from the unfolding state to the closed state, the second body is adapted to drive the first screen to slide along the first body toward the second side, and the first screen pushes against the second screen to be flush with the second side of the first body.

8. The foldable electronic device according to claim 2, wherein the at least one hinge structure comprises:
a torque element disposed in the first body;
a rotating shaft rotatably passes through the torque element;
a first bracket disposed at the torque element and fixed to the first body;
a second bracket disposed at the rotating shaft and fixedly connected to the second screen; and
a driving rod fixedly sleeved over the rotating shaft and pivotally connected to the second end of the position-limiting frame.

9. The foldable electronic device according to claim 8, wherein the rotating shaft has a rotating portion, a connecting portion, and a latching portion, the rotating portion rotatably passes through the torque element, the connecting portion is far away from the rotating portion and is fixedly connected to the second bracket, the latching portion is located between the rotating portion and the connecting portion, the driving rod is engaged with the latching portion, and the driving rod is adapted to rotate relative to the torque element with the rotating shaft to drive the second end of the position-limiting frame.

10. The foldable electronic device according to claim 8, wherein the base has a lifting groove, the rotating shaft is adapted to rotate relative to the torque element, and the second end of the position-limiting frame is driven to move vertically along the lifting groove through the driving rod.

11. The foldable electronic device according to claim 9, wherein when the driving rod drives the second end to move to a bottom end of a lifting groove, the second screen is bent relative to the first body.

12. The foldable electronic device according to claim 9, wherein when the driving rod drives the second end to move to a top end of a lifting groove, the second screen is flush with the second side of the first body.

13. The foldable electronic device according to claim 1, further comprising a bracket rotatably connected to a rear side of the first body relative to the first screen and adapted to rotate relative to the first body to switch to a supporting state or a storage state.

14. The foldable electronic device according to claim 13, wherein in the supporting state, the bracket is unfolded from the first body, an unfolding angle is formed between the bracket and the rear side, and in the storage state, the bracket is attached to the rear side, the bracket is tightly integrated with the first body.

* * * * *